United States Patent [19]

Schniederjan

[11] Patent Number: 5,024,143
[45] Date of Patent: Jun. 18, 1991

[54] SWASHPLATE TYPE HYDRAULIC AXIAL PISTON MACHINE HAVING A TRACKING DEVICE FOR THE CAGE OF THE SEGMENTAL ROLLING CONTACT BEARING OF THE SWASHPLATE

[75] Inventor: Reinhold Schniederjan, Neu-Ulm, Fed. Rep. of Germany

[73] Assignee: Hydromatik GmbH, Fed. Rep. of Germany

[21] Appl. No.: 523,770

[22] Filed: May 15, 1990

[30] Foreign Application Priority Data

May 16, 1989 [DE] Fed. Rep. of Germany ....... 3915904

[51] Int. Cl.$^5$ .............................................. F01B 3/02
[52] U.S. Cl. ...................................... 92/12.2; 92/57; 92/70; 92/71; 91/504; 91/505; 91/506; 74/60
[58] Field of Search ...................... 92/12.2, 57, 70, 71; 91/504, 505, 506; 74/60; 417/218, 220

[56] References Cited

U.S. PATENT DOCUMENTS

| | | | |
|---|---|---|---|
| 3,381,624 | 5/1968 | Born | 92/12.2 |
| 3,396,670 | 8/1968 | Baits | 91/506 |
| 3,429,225 | 2/1969 | Keyworth | 92/12.2 |
| 3,465,680 | 9/1969 | Saka | 91/505 |
| 3,641,829 | 2/1972 | Reynolds | 92/57 X |
| 4,029,367 | 6/1977 | Schwede et al. | 91/505 X |
| 4,627,330 | 12/1986 | Beck | 91/505 X |
| 4,666,338 | 8/1984 | Stoelzer | 91/506 |
| 4,856,917 | 8/1989 | Schroder et al. | 92/12.2 X |
| 4,858,480 | 8/1989 | Rohde et al. | 74/60 |

FOREIGN PATENT DOCUMENTS

| | | |
|---|---|---|
| 1653617 | 7/1971 | Fed. Rep. of Germany . |
| 2521312 | 5/1975 | Fed. Rep. of Germany . |
| 2625298 | 12/1977 | Fed. Rep. of Germany . |
| 3000921 | 7/1981 | Fed. Rep. of Germany . |
| 3442391 | 1/1986 | Fed. Rep. of Germany ....... 92/12.2 |
| 3711468 | 10/1988 | Fed. Rep. of Germany . |

Primary Examiner—John T. Kwon
Assistant Examiner—Todd Mattingly
Attorney, Agent, or Firm—Scully, Scott, Murphy & Presser

[57] ABSTRACT

A swashplate type hydraulic axial piston machine whose swashplate is arranged on a rocker mounted to pivot in a segmental rolling contact bearing has a tracking device for the cage of the pivot bearing which comprises a rod-like guide element which is connected to said rocker in a first bearing in the rocker so that it can pivot parallel to the pivot plane (SE), is connected to said cage in a second bearing so that it can pivot parallel to the pivot plane (SE) and so that it can be displaced longitudinally, and is mounted to pivot parallel to the pivot plane (SE) in a third bearing. To make tracking by the cage possible without mounting the guide element on the housing, a rocker adjustment member is provided mounted so that it can be displaced transverse to the middle axis of the axial piston machine, and the third bearing is arranged on a guide member movably connected to the adjustment member and the rocker.

11 Claims, 3 Drawing Sheets

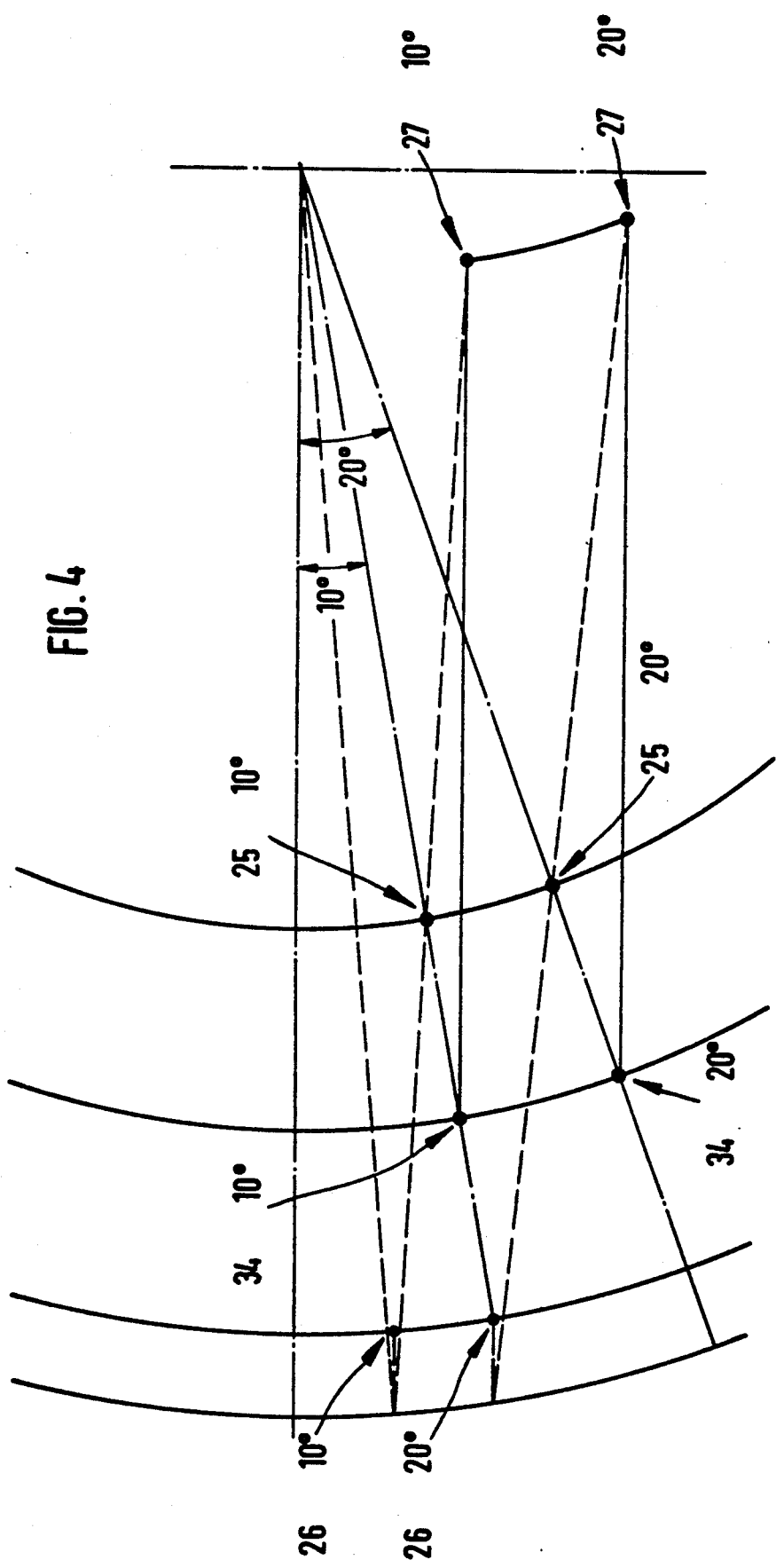

SWASHPLATE TYPE HYDRAULIC AXIAL PISTON MACHINE HAVING A TRACKING DEVICE FOR THE CAGE OF THE SEGMENTAL ROLLING CONTACT BEARING OF THE SWASHPLATE

TECHNICAL FIELD OF THE INVENTION

The invention relates to an axial piston machine according to the preamble of claim 1.

BACKGROUND OF THE INVENTION AND PRIOR ART

An axial piston machine of this kind is described and illustrated in DE-OS 30 00 921. In this known arrangement the rod-like guide element can pivot in its first bearing in the pivot plane of the segmental rolling contact bearing and is connected to the rocker so that it can be displaced longitudinally. In its second bearing it passes through an extension of the cage transverse to the cage in a guide hole, as a result of which it can likewise pivot in the pivot plane of the segmental rolling contact bearing and is connected to the cage so that it is displaceable longitudinally. At its third bearing point the rod-like guide element can likewise pivot in the pivot plane of the segment rolling contact bearing but is mounted on the housing of the axial piston machine so that it cannot be displaced longitudinally.

This known arrangement enables the cage to be guided accurately enough for slipping of the cage circumferentially of the segmental rolling contact bearing to be avoided. To compensate, in particular in the case of large pivot angles, for differential movements occurring between the guide element and the cage, the guide element comprises an elastically flexible spring wire which, because of its elastic flexibility, can adapt to the differential movements.

This known arrangement has worked well in practice. However, it can only be used if the third bearing is fixed to the housing. This, however, is not always possible, for example because of space restrictions.

OBJECT OF THE INVENTION

In is an object of the invention to provide an axial piston machine of the kind mentioned in the introduction so that tracking by the cage is possible without the guide element being mounted on the housing.

SUMMARY OF THE INVENTION

In the arrangement according to the invention the adjustment member that guided so as to be displaceable transverse to the axis of the axial piston machine and the rocker or swashplate are used to form the third bearing, with the additional guide member that cooperates with them constituting the third bearing. As a result of this arrangement tracking by the cage is ensured even if it is not supported on the housing or a component thereof. In particular, sufficiently accurate tracking movements can be achieved in a pivot range of ±20° without substantial force.

Advantageous further developments of the invention which lead to embodiments that both function well and are simple and economical to manufacture, and which are also advantageous from the points of view of assembly and dismantling and of space are described in the subclaims.

BRIEF DESCRIPTION OF THE DRAWINGS

The invention will now be described in more detail with reference to a preferred exemplary embodiment and a drawing, in which.

DETAILED DESCRIPTION OF A PREFERRED EMBODIMENT OF THE INVENTION

Figure 1:
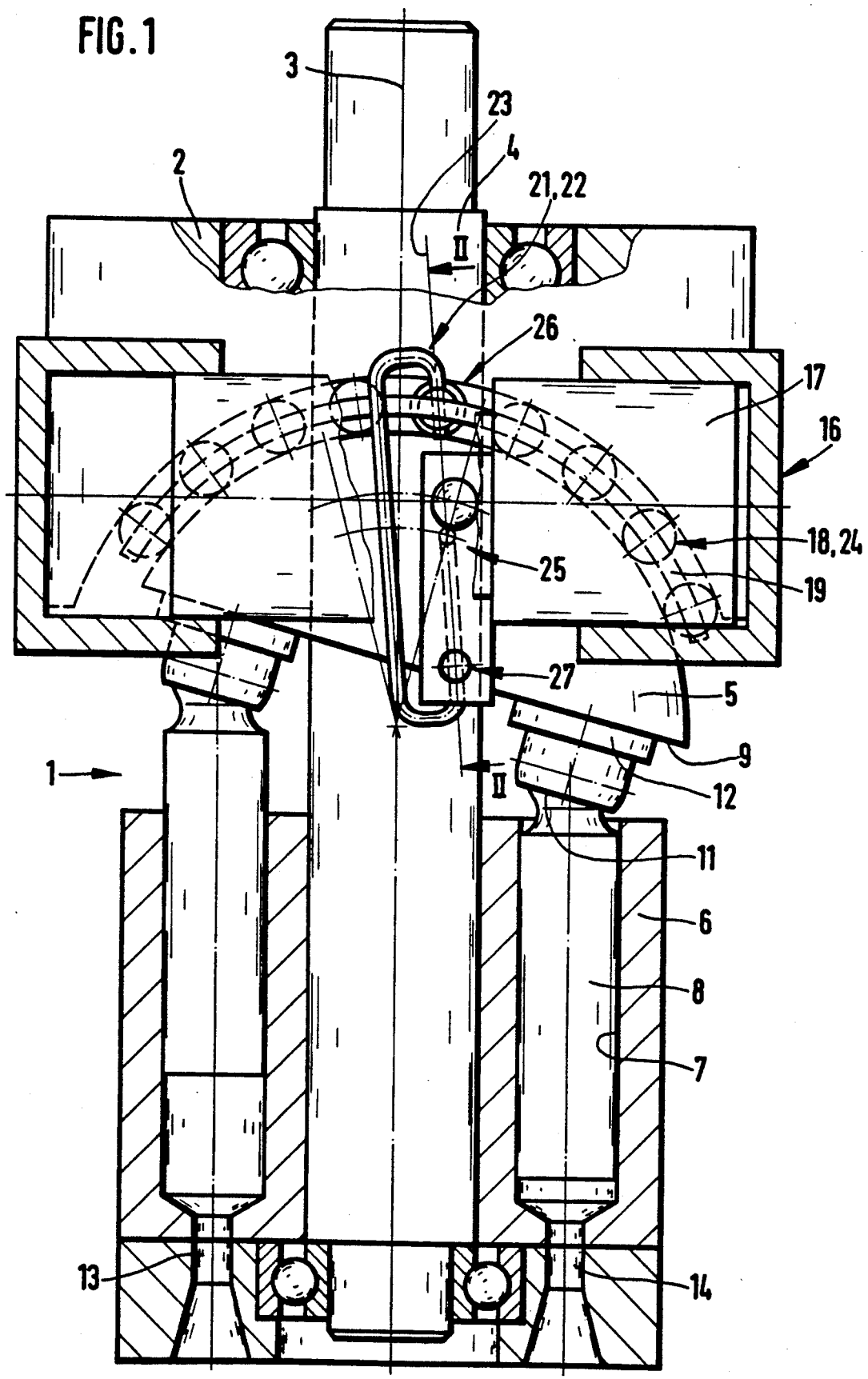
FIG. 1 is a simplified illustration of an axial piston machine designed according to the invention.
Figure 2:
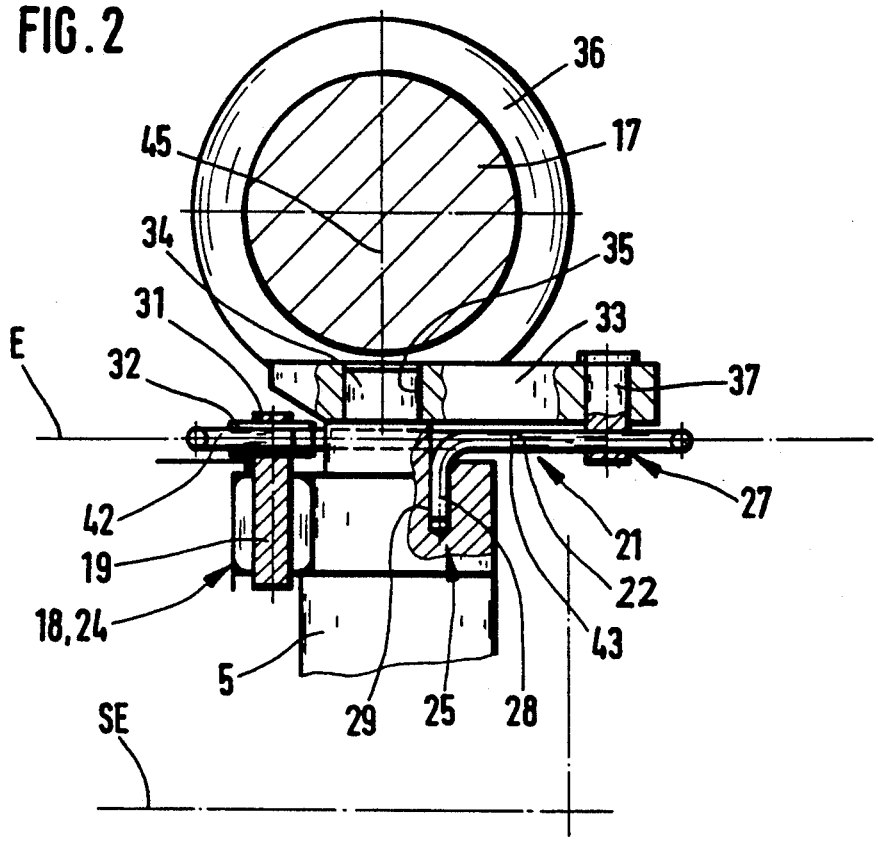
FIG. 2 is a section on the line II—II in FIG. 1.

The essential parts of the swashplate type axial piston machine 1 shown in FIG. 1 are a housing 2, a drive shaft 4 mounted in the housing 2 and rotatable about its middle axis 3, a swashplate in the form of a rocker 5 mounted in the housing 2, if desired so as to pivot on the drive shaft 4, a cylinder 6 arranged on the drive shaft 4 opposite the rocker 5 and having a plurality of axial piston bores 7 distributed uniformly on its periphery in which pistons 8 are axially displaceably mounted. The ends of the pistons facing the swashplate 9 have piston heads 11 with which they slide on the swashplate 9 by means of slippers 12. The machine also includes control slits 13, 14 which control the feeding or removal of the hydraulic medium from a feed line or to a discharge line as the cylinder 6, which rotates with the drive shaft 4, rotates, and a hydraulic adjusting cylinder 16 whose piston 17 adjusts and arrests the rocker in the respective adjustment position for setting a specific operational volume. With the reciprocating pivoting movements of the rocker 5 it is possible for the cage 19 of the rolling contact bearing segment 18, arranged between the concave bearing surface of the housing 2 and the convex bearing surface of the rocker 5, to be displaced or slip laterally from a predetermined relative position of the bearing parts as a result of sliding movements which cannot be avoided in the long run. To avoid this a tracking device 21 is provided which prevents the cage 19 from moving out of its predetermined pivoting range. The tracking device 21 has a rod-like guide element 22 whose effective axis is indicated by 23. When viewed at right angles to the plane of movement E of the guide element 22, which extends parallel to the pivot plane SE of the pivot bearing indicated generally by 24, the effective axis 23 passes through three bearings 25, 26, 27 for the guide element 22. In the first bearing, indicated by 25, the guide element 22 can pivot in the pivot plane E and is mounted on the side face of the rocker 5 so that it can be displaced longitudinally (effective axis 23). For this purpose a journal 28 extending transverse to the effective axis 23 is provided, which engages in a correspondingly sized bore 29 in the rocker 5 and is rotatably mounted therein.

In the second bearing 26 the guide element 22 passes radially through the cage 19 in a laterally projecting carrier attachment 31. To receive the guide element 22 a bush 32 is inserted securely in the carrier attachment 31 in which the guide element 22 is mounted so that it is freely displaceable longitudinally (effective axis 23).

The piston 17 is connected to the rocker 5 by means of a slide block 33 of rectangular cross-section and a bearing journal 34 on the rocker 5. The slide block 33 is mounted on the bearing journal 34 by means of the bearing bore 35 so that it can pivot about the axis of the bearing journal 34. The bearing journal 34 extends transverse to the piston 17 and engages substantially sealingly in a peripheral groove 36 of rectangular cross-section in the piston 17. The bearing bore 35 is located at one end of the slide block 33. At the other end a hinge pin 37 extending parallel to the bearing journal 34 is mounted in the slide block 33 to rotate freely, and projects from the underside of the slide block 33, which is arranged slightly higher than the guide element 22. The rod-like guide element 22 passes diametrically through the hinge pin 37 in a cross-bore with sliding play. This makes up the third bearing 27 of the guide element 22.

The guide element 22 itself comprises a C-shaped circular rod 41, preferably of spring steel, whose rod sections 42, 43, facing one another, extend in a straight line and coaxially to one another. The back section 44 of the C-shape extends parallel to the rod sections 42, 43. As a result of this C-shape the rod-like guide element 22 does not need to extend in a straight line between the bearings 25 to 27 but projects from outside into the second and third bearings 26, 27, avoiding the pivot journal 34 whose pivot axis 45 intersects the effective axis 23. The length of the rod sections 42, 43 facing one another is such that the rod sections 42, 43 do not slip out of the bearing points 26, 27 as the rocker 5 reciprocates.

Figure 3:
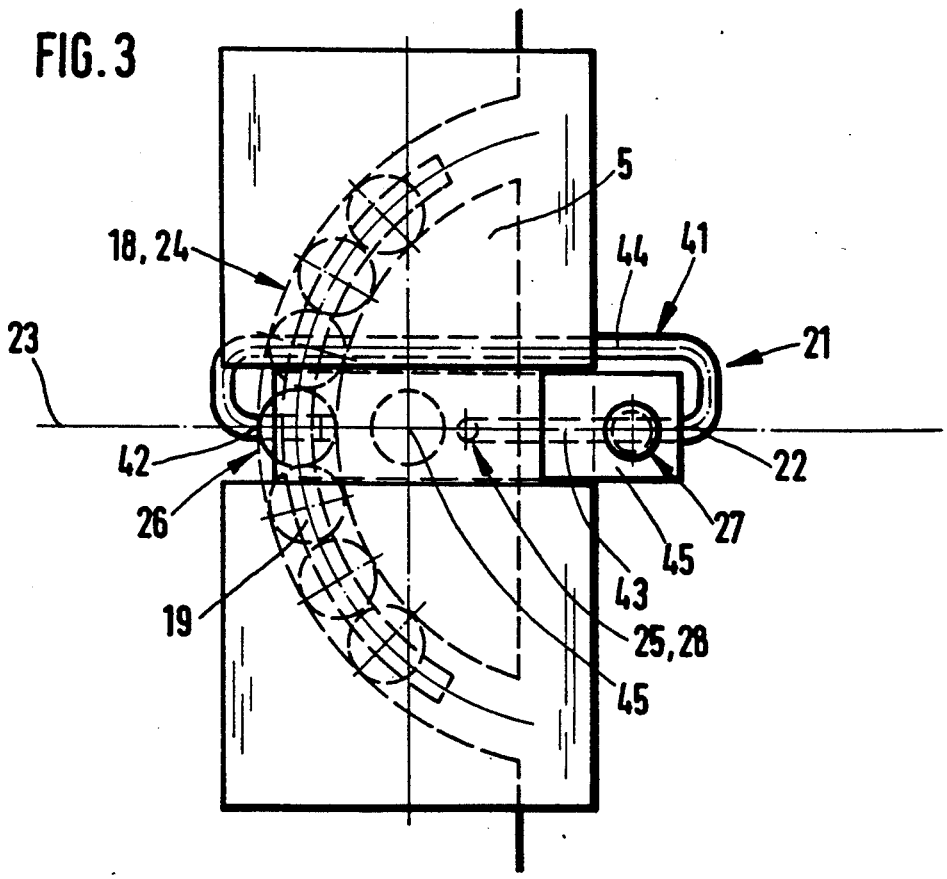
FIG. 3 is a plan view of the detail shown in FIG. 2.

When the rocker 5 is caused to pivot downwards, for example as shown in FIG. 3, by the piston 17 engaging with the pivot journal 34, the bearings 26, 27, 28 necessarily move downwards and, in the respective pivot position (e.g. 10° or 20°), take up positions in which the bearing 26 is displaced (rolling) with the cage 19 relative to the peripheral travel of the slideway of the rocker 5 by only half of said travel. These positions are shown in FIG. 4 for the cases of pivoting through 10° and 20°.

Within the scope of the invention it is also possible for the bearing points 25, 27 of the guide element on the slide block 33 and on the rocker 5 to be between the pivot journal 34 and the bearing 26 on the cage 19.

What is claimed is:

1. A swashplate type hydraulic axial piston machine wherein the swashplate is arranged on a rocker mounted to pivot in a segmental rolling contact bearing, said machine having a tracking device for the cage of said pivot bearing which comprises a rod-like guide element which is connected to said rocker in a first bearing in the rocker so that it can pivot parallel to the pivot plane and is connected to said cage in a second bearing so that it can pivot parallel to the pivot plane and can be displaced longitudinally, and is mounted to pivot parallel to the pivot plane in a third bearing, characterised in that said rocker can be adjusted by an adjustment member mounted so that it can be displaced transverse to the middle axis of the axial piston machine and that said third bearing is arranged on a guide member which is movably connected to the adjustment member and the rocker.

2. An axial piston machine according to claim 1, wherein said guide member is connected to said rocker to pivot in the pivot plane and is connected to said adjustment member for adjustment parallel to the middle axis.

3. An axial piston machine according to claim 2, wherein said guide member comprises a slide block which is connected to said rocker by a pivot journal extending at right angles to the pivot plane, preferably arranged on the rocker and engaging in a bearing bore preferably formed in the slide block; is guided in a peripheral groove in the adjustment member to be displaceable along said middle axis; and is connected to said guide element in said third bearing to pivot parallel to the pivot plane of the pivot bearing.

4. An axial piston machine according to claim 1, wherein said guide element is mounted to the rocker in said first bearing so that it cannot be displaced longitudinally and is connected on the slide block in said third bearing so that it can be displaced longitudinally.

5. An axial piston machine according to claim 1, wherein said adjustment member is a hydraulic piston.

6. An axial piston machine according to claim 3, wherein said guide member is arranged between said rocker and said slide block and passes diametrically, with play, through a hinge pin that extends at right angles to the pivot plane and projects from said slide block.

7. An axial piston machine according to claim 1, wherein said first bearing and said third bearing are arranged on the side of the pivot journal remote from said second bearing.

8. An axial piston machine according to claim 1, wherein said first bearing and said third bearing are arranged between said second bearing and said pivot journal.

9. An axial piston machine according to claim 1, wherein said guide member comprises a C-shaped circular wire of which one of the mutually facing free ends extends into the region of said second bearing and the other free end extends through said third bearing to said first bearing.

10. An axial piston machine according to claim 9, wherein said first bearing comprises a blind bore in the pivot rocker extending at right angles to the pivot plane and a limb, bent at right angles, of said free end that extends to said third and first bearings.

11. An axial piston machine according to claim 9, wherein said wire consists of spring steel.

* * * * *

UNITED STATES PATENT AND TRADEMARK OFFICE
CERTIFICATE OF CORRECTION

PATENT NO. : 5,024,143

DATED : June 18, 1991

INVENTOR(S) : Reinhold Schneiderjan

It is certified that error appears in the above-identified patent and that said Letters Patent is hereby corrected as shown below:

Column 1, line 45:  "In"  should read as --It--

Column 1, line 52:  "that guided"  should read as --that is guided--

Signed and Sealed this

Twelfth Day of January, 1993

*Attest:*

DOUGLAS B. COMER

*Attesting Officer*      *Acting Commissioner of Patents and Trademarks*